(12) United States Patent
Tsurumoto

(10) Patent No.: US 7,111,315 B1
(45) Date of Patent: Sep. 19, 2006

(54) INFORMATION PROVIDING APPARATUS AND METHOD, INFORMATION RECEIVING APPARATUS AND METHOD, INFORMATION PROVIDING SYSTEM, AND TRANSMISSION MEDIUM

(75) Inventor: Takashi Tsurumoto, Saitama (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/134,270

(22) Filed: Aug. 14, 1998

(30) Foreign Application Priority Data

Aug. 19, 1997 (JP) ............................... P9-222292

(51) Int. Cl.
*G06F 3/00* (2006.01)

(52) U.S. Cl. .......................................... 725/39; 725/32

(58) Field of Classification Search ................. 725/39, 725/40, 43, 32–37; 348/473–474, 563, 569, 348/585
See application file for complete search history.

(56) References Cited

U.S. PATENT DOCUMENTS

| | | | | |
|---|---|---|---|---|
| 5,497,187 A | * | 3/1996 | Banker et al. .............. | 725/144 |
| 5,557,338 A | * | 9/1996 | Maze ........................... | 725/38 |
| 5,686,954 A | * | 11/1997 | Yoshinobu et al. ........... | 725/43 |
| 5,826,031 A | * | 10/1998 | Nielsen ....................... | 709/233 |
| 5,850,218 A | * | 12/1998 | LaJoie ......................... | 725/45 |
| 5,864,358 A | * | 1/1999 | Suzuki et al. ............... | 725/142 |
| 6,057,890 A | * | 5/2000 | Virden ......................... | 348/563 |
| 6,160,989 A | * | 12/2000 | Hendricks et al. ............ | 725/36 |
| 6,172,677 B1 | * | 1/2001 | Stautner ...................... | 345/716 |
| 6,215,530 B1 | * | 4/2001 | Wasilewski ................. | 348/731 |

* cited by examiner

*Primary Examiner*—John Miller
*Assistant Examiner*—Hunter B. Lonsberry
(74) *Attorney, Agent, or Firm*—Lerner, David, Littenberg, Krumholz & Mentlik, LLP

(57) ABSTRACT

To make it possible to transmit many messages without seriously affecting video information which essentially has to be transmitted, messages are registered in a DMT, and indexes to the messages are registered in an rDMT. The rDMT is transmitted by every transponder, while the DMT is transmitted by a single predetermined transponder.

35 Claims, 15 Drawing Sheets

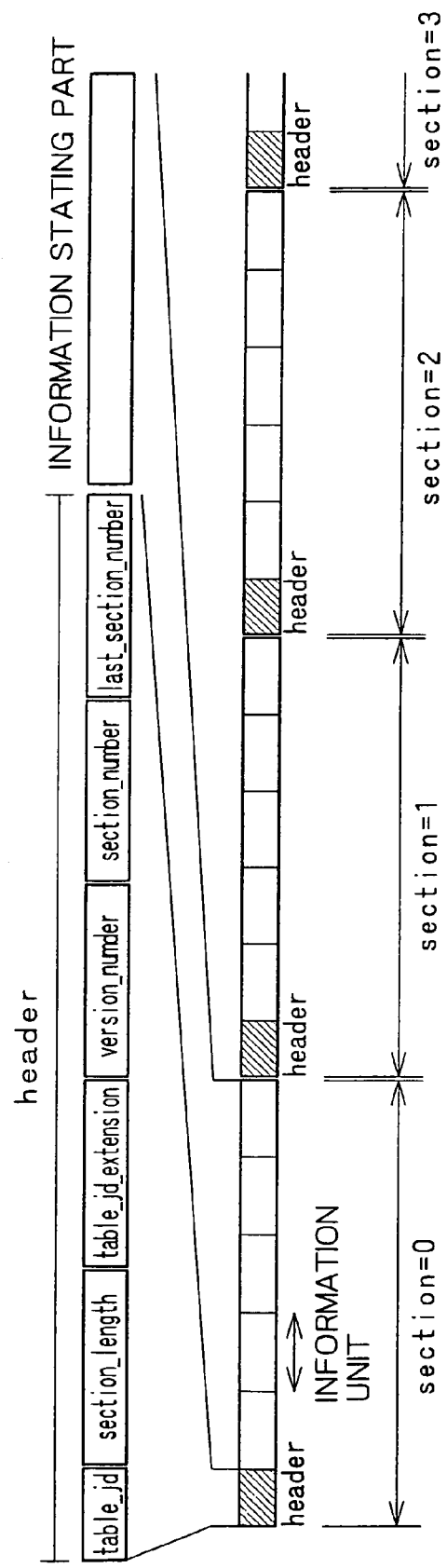

FIG. 6

TABLE CONFIGURATION IMAGE OF EPG

NIT (OVERALL CONFIGURATION OF THE NETWORK AND NECESSARY INFORMATION FOR RECEPTION ARE STATED. THERE IS ONE IN THE NETWORK.)

SDT (SERVICE INFORMATION IS STATED. THERE IS ONE IN EACH STREAM.)

pfEIT (INFORMATION ON THE CURRENT PROGRAM AND THE NEXT PROGRAM IS STATED. THERE IS ONE ON EACH CHANNEL.)

ETT (THE "event_id" AND THE BROADCAST START TIME OF EVERY PROGRAM AND THE SECTION NUMBER OF THE gEMT IN WHICH INFORMATION IS WRITTEN ARE STATED.)

gEMT (OTHER EVENT INFORMATION THAT NVOD IS STATED. THERE IS ONE IN EVERY DUMMY SERVICE OF N VOD CHANNELS.)

nEMT (INFORMATION ON EVENTS OF NVOD IS STATED. THERE IS ONE IN EVERY DUMMY SERVICE OF NVOD CHANNELS.)

dEMT (OUTLINE DOCUMENTS OF EVENTS ARE STATED. THERE IS ONE IN EVERY DUMMY SERVICE.)

rDMT (INDEXES OF MESSAGES ARE STATED.)

DMT (MESSAGES ARE STATED.)

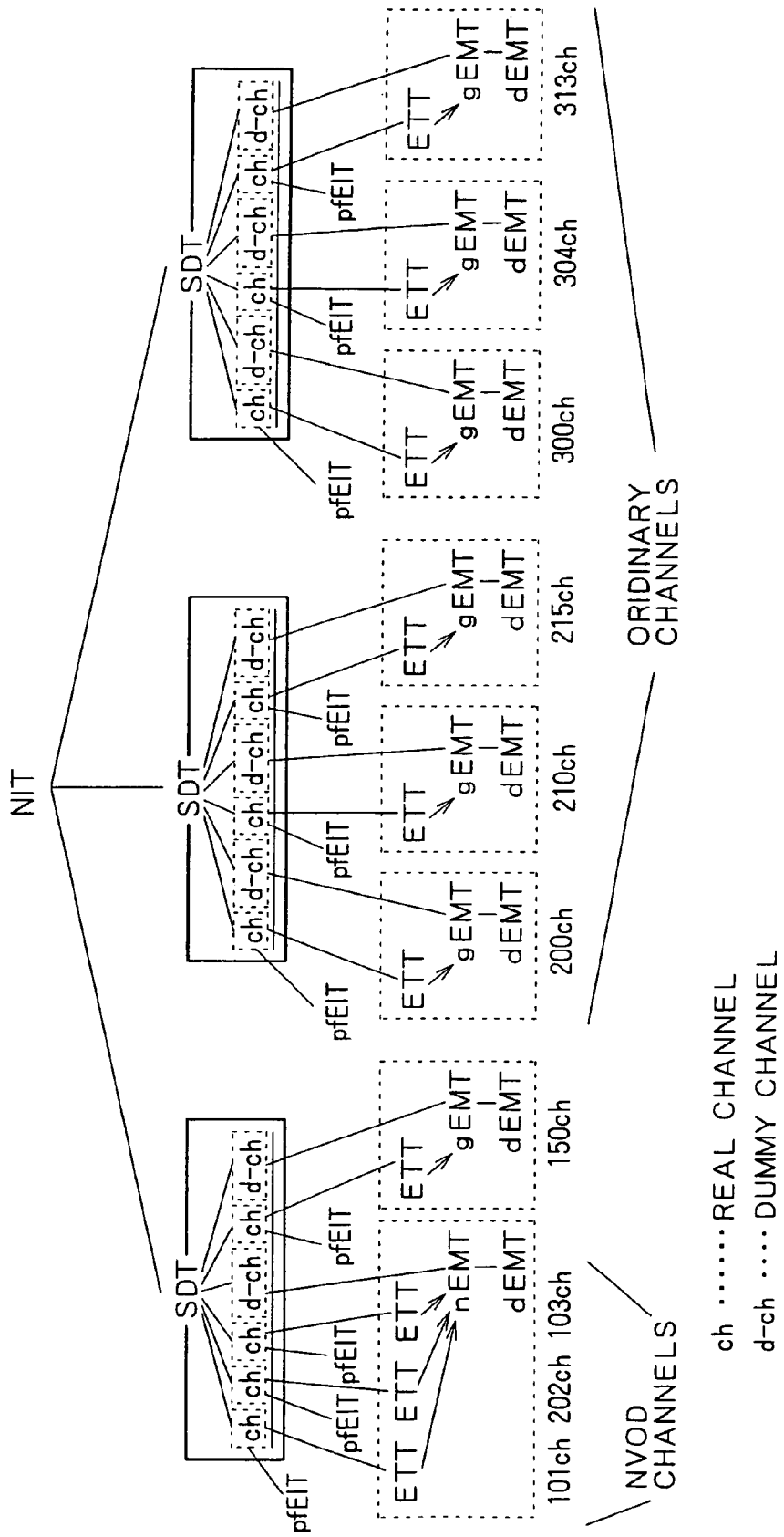

CONFIGURATION OF SCHEDULE TABLE

FIG. 9A

```
1ST INSTALLMENT

TITLE: THE STORY OF A LOVE AFFAIR (1).

INTRODUCTORY MESSAGE:
  IN 8 INSTALLMENTS. A WORK COMICALLY
EXPRESSING THE MOVES OF A YOUNG
WOMAN'S EMOTION. WHAT WILL BE THE
OUTCOME OF HER LOVE?
THE MAN WHO HAS SUDDENLY
APPEARED BEFORE YUKIE···
```

FIG. 9B

```
2ST INSTALLMENT

TITLE: THE STORY OF A LOVE AFFAIR (2)

INTRODUCTORY MESSAGE:
  IN 8 INSTALLMENTS. A WORK COMICALLY
EXPRESSING THE MOVES OF A TOUNG
WOMAN'S EMOTION. WHAT WILL BE THE
OUTCOME OF HER LOVE?
  YUKIE SUDDENLY MEETS HIM AGAIN.
THEN YUKIE ...
```

FIG. 11

LIST OF TITLES OF
NVOD PROGRAMS

- GIANT
- SUMMERTIME
- ROMAN HOLIDAY
- RED BEARD
- MODERN TIMES
- PEPELE MOKO
- SEVEN SAMURAI

FIG. 12

NVOD START TIME
SCHEDULE

GIANT
18:00 ~
19:00 ~
20:00 ~
21:00 ~
22:00 ~

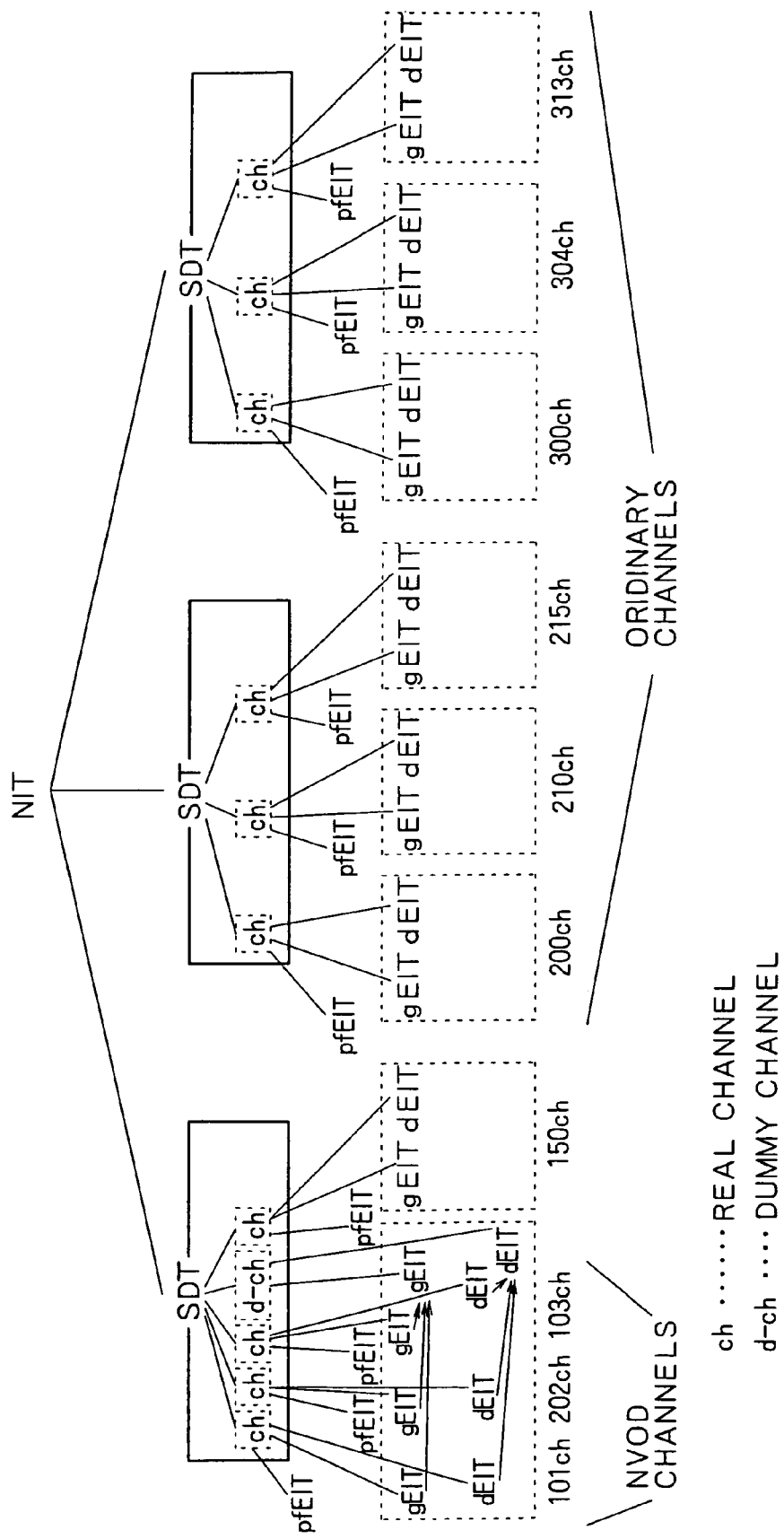

INFORMATION PROVIDING APPARATUS AND METHOD, INFORMATION RECEIVING APPARATUS AND METHOD, INFORMATION PROVIDING SYSTEM, AND TRANSMISSION MEDIUM

BACKGROUND OF THE INVENTION

The present invention relates to an information providing apparatus and method, an information receiving apparatus and method, an information providing system, and a transmission medium and more particularly to an information providing apparatus and method, an information receiving apparatus and method, an information providing system, and a transmission medium enabled to transmit more messages without affecting video information, which essentially is to be transmitted by synthesizing EPG information from first information and second information.

Recently, digital television broadcasting was started in Japan, too, and programs have come to be offered to the audience on 100 or more channels. Such an increase in the number of programs complicates the operation to select a desired program out of them. Also, as the number of channels increases, on top of an increase in the quantity of the information involved, a program schedule for not only one day but also for a week or so ahead becomes required by the audience for watching programs in a planned manner. For this reason, the data quantity of the program schedule becomes tremendously large, and it becomes difficult for paper media, mainly newspapers, to provide program schedules as before. Moreover, in case there is a change in the broadcast schedule of any program, it is difficult to change the program schedule on a paper medium.

In this connection, it is proposed that an EPG (Electronic Program Guide) to support program selection should be transmitted from the program provider's side to the audience. As international standard on this EPG, the format of DVD_SI (Digital Video Broadcast Service Information) is prescribed.

If a program schedule is turned into data as EPG and offered to the audience, extraction of EPG data received by a receiving apparatus will enable the titles of programs, a program schedule, channel logos and the like to be indicated on the display, and the desired program to be quickly and correctly selected. Furthermore, any alteration in the broadcast time of a program can be easily coped with, and the viewer can correctly reserve the video recording of or watch the desired program.

FIG. 16 shows an example of a variety of tables constituting an EPG according to the prior art. An NIT (Network_Information_Table) states the overall configuration of the network and information necessary for reception, and one NIT exists for each network. In this NIT is stated an SDT (Service_Description_Table).

An SDT exists for each stream. For instance, if this EPG is to be transmitted via a satellite, an SDT is defined for each carrier wave (each transponder). In an SDT, information on the channel for transmission on the carrier wave is stated in pfEIT, gEIT and dEIT. In the pfEIT (present_following_Event_Information_Table) are stated the program currently broadcast on that channel and the next program. In the dEIT (detail-Event_Information_Table) is stated a document concerning an outline of the event (program), and in the gEIT (general-Event_Information_Table) is stated information other than the outline document concerning the program.

On the other hand, where NVOD (near video on demand) service is operated, a dummy channel (d-ch) is provided besides the channel on which program information is delivered (ch). In the dEIT and the gEIT of the dummy channel, the outline document and other information on the program broadcast by NVOD are respectively stated. On the other hand, in the dEIT and the gEIT of the channel on which the video information of NVOD is actually broadcast, the dEIT or the gEIT of the dummy channel is respectively stated and referred to.

Further, when transmitting messages from the originating side to the receiving side, the messages were inserted into the NIT.

However, transmission of messages by NIT involved the problem that the number of messages that could be transmitted was small because an NIT basically has no structure allowing the carriage of many data.

As a result, it was almost only the network manager who could transmit message; for instance, when a program provider having a channel is to transmit an announcement of a special program, a notice of a campaign, a guide on how to watch or listen to a program, or the like to the audience, it was transmitted as detailed information on a program.

However, if messages are transmitted in this way as detailed information on a program, the contents of the same messages are transmitted as EPG information on all the programs, and this is not only wasteful, but also the transmission capacity for essential program information is that much reduced. Accordingly there was the problem that, when a viewer wanted to know essential EPG information (such as the content of a program), unnecessary information was displayed against his or her wish, resulting in inconvenience of handling.

Moreover there was the problem that if, for instance, it became necessary to replace the operating software for the receiving apparatus by downloading, its notice, and the content and method of the change could not be transmitted to the audience as message.

Furthermore, there was the problem that, if messages were to be transmitted by NIT, the need to transmit an NIT increased that much, and the probability of the occurrence of a situation in which no NIT could be received would correspondingly increase. Since an NIT basically carries information which the viewer needs when selecting a channel, should no NIT become impossible to be received, he or she would become unable to choose none of the programs on any channel.

SUMMARY OF THE INVENTION

The present invention addresses such a situation, and makes possible transmission of many messages without seriously affecting essential video information which is to be transmitted.

According to an aspect of the invention, an information providing apparatus includes first generating means for generating first information including messages; second generating means for generating second information including indexes to the messages; and synthesizing means for synthesizing the first and second information as EPG information.

According to another aspect of the invention, an information providing method includes a first generating step to generate first information including messages; a second generating step to generate second information including indexes to the messages; and a synthesizing step to synthesize the first and second information as EPG information.

According to a further aspect of the invention, a medium is provided for storing a program that includes a first generating step to generate first information including messages; a second generating step to generate second information including indexes to the messages; and a synthesizing step to synthesize the first and second information as EPG information.

According to yet another aspect of the invention, an information receiving apparatus includes receiving means for receiving signals which have been transmitted; extracting means for extracting messages from the signals received by the receiving means; determining means for determining the types of the messages extracted by said extracting means; and display control means responsive to the result of determination by the determining means for controlling the on-screen displaying of the messages in relation to the video information.

According to a still further aspect of the invention, an information receiving method includes a receiving step to receive signals which have been transmitted; an extracting step to extract messages from the signals received at said receiving step; a determining step to determine the types of the messages extracted at the extracting step; and a display control step responsive to the result of determination at the determining step to control the on-screen displaying of the messages in relation to the video information.

In accordance with an additional aspect of the invention, a medium is provided for storing a program includes a receiving step to receive signals which have been transmitted; an extracting step to extract messages from the signals received at the receiving step; a determining step to determine the types of the messages extracted at the extracting step; and a display control step responsive to the result of determination at the determining step to control the on-screen displaying of the messages in relation to the video information.

In accordance with yet an additional aspect of the invention, an information providing system receives, with an information receiving apparatus, EPG information superimposed on video information from an information providing apparatus. The information providing apparatus includes first generating means for generating first information including messages; second generating means for generating second information including indexes to the messages; and synthesizing means for synthesizing the first and second information as EPG information. The information receiving apparatus includes receiving means for receiving signals transmitted in which the EPG information is superimposed on video information; extracting means for extracting messages from the signals received by the receiving means; and display control means for controlling the on-screen displaying of the messages extracted by the extracting means in relation to the video information.

According to still another aspect of the invention, an information providing method receives, with an information receiving apparatus, EPG information provided superimposed on video information from an information providing apparatus. At the information providing apparatus, the method includes a first generating step to generate first information including messages; a second generating step to generate second information including indexes to the messages; and a synthesizing step to synthesize the first and second information as EPO information. At the information receiving apparatus, the method includes a receiving step to receive signals which have been transmitted; an extracting step to extract messages from the signals received at the receiving step; and a display control step to control the on-screen displaying of the messages extracted at the extracting step in relation to the video information.

According to yet a further aspect of the invention, a medium for storing programs for use in an information providing system that receives, with an information receiving apparatus, EPG information provided superimposed on video information from an information providing apparatus. A program for the information providing apparatus includes a first generating step to generate first information including messages; a second generating step to generate second information including indexes to the messages; and a synthesizing step to synthesize the first and second information as said EPG information. A program for the information receiving apparatus includes a receiving step to receive signals which have been transmitted; an extracting step to extract messages from the signals received at the receiving step; and a display control step to control the on-screen displaying of the messages extracted at the extracting step in relation to the video information.

In the above-described information providing apparatus, information providing method, and transmission medium, the first information including the messages and the second information including the indexes to the messages are synthesized into the EPG information.

In the information receiving apparatus, information receiving method, and transmission medium described above, the messages are extracted from the transmitted signals, and the type of the extracted messages is determined. And according to the result of determination, the on-screen displaying of the messages in relation to the video information is controlled.

In the above-described information providing system, information providing method, and transmission medium, the first information and the second information are synthesized into the EPG information. The messages are extracted from the received signals, and displayed on screen in relation to the video information.

BRIEF DESCRIPTION OF THE DRAWINGS

FIG. 5 is a diagram for explaining the transmission format for tables.

FIG. 6 is a diagram for explaining the capacities of tables.

FIG. 7 is a diagram for explaining reference relationships among tables.

FIGS. 9A to 9B are diagrams illustrating examples of how an EPG is displayed.

FIG. 11 is a diagram illustrating an example of how a list of titles of NVOD programs is displayed.

FIG. 12 is a diagram illustrating an example of how start times of an NVOD program are displayed.

FIG. 16 is a diagram for explaining the relationships among tables according to the prior art.

DETAILED DESCRIPTION

Whereas modes of carrying out the present invention will be described below, a description of the characteristics of the invention with the parenthesized addition of a corresponding mode of carrying out (though only one example) following each means to identify the relationships of correspondence between the respective means of the invention stated in the Scope of the Claims and the following modes of carrying out will be as follows. However, this description of course does not mean limitation to the described means.

An information providing apparatus is provided with the first generating means (for example a DMT generating section 33-9 in FIG. 3) for generating the first information including the messages; the second generating means (for example a rDMT generating section 33-8 in FIG. 3) for generating the second information including indexes to the messages; and the synthesizing means (for example a TS packeting section 35 in FIG. 2) for synthesizing the first information and the second information as EPG information.

An information receiving apparatus is provided with the receiving means (for example a front end section 51 in FIG. 4) for receiving signals which have been transmitted; the extracting means (for example a demultiplexer 57 in FIG. 4) for extracting the messages from the signals received by the receiving means; the determining means (for example steps S1 to S4 in FIG. 15) for determining the types of the messages extracted by the extracting means; and the display control means (for example steps S6 to S9 in FIG. 15) responsive to the result of determination by the determining means to control the on-screen displaying of the messages in relation to the video information in the messages.

In an information providing system, the information providing apparatus is provided with the first generating means (for example the DMT generating section 33-9 in FIG. 3) for generating the first information including the messages; the second generating means (for example the rEMT generating section 33-8 in FIG. 3) for generating the second information including the indexes to the messages; and the synthesizing means (for example the TS packeting section 35 in FIG. 2) for synthesizing the first and second information as EPG information; and the information receiving apparatus is provided with the receiving means (for example the front end section 51 in FIG. 4) for receiving signals transmitted superimposed on video signals; the extracting means (for example the demultiplexer 57 in FIG. 4) for extracting the messages from the signals received by the receiving means; and the display control means (for example the EPG processor 59 in FIG. 4) for controlling the displaying of the messages extracted by the extracting means in relation to the video information.

Figure 1:
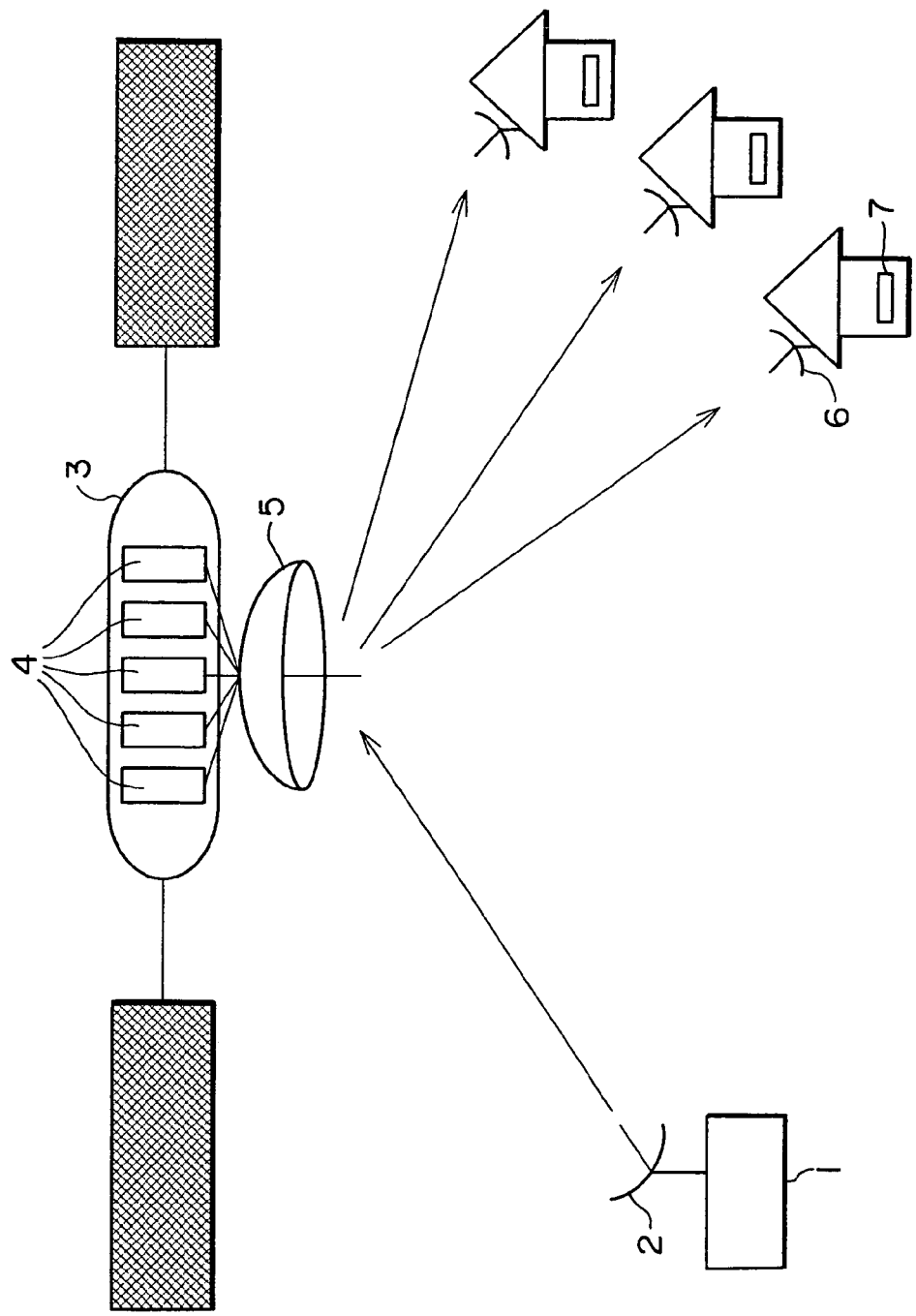
FIG. 1 is a diagram illustrating an example of configuration of an information providing system to which the present invention is applied.

FIG. 1 illustrates an example of configuration of an information providing system to which the present invention is applied. A transmitting apparatus 1 multiplexes EPG information with program information, and transmits it from a transmitting antenna 2 to a satellite 3. The satellite 3 receives these signals with an antenna 5. The satellite 3 has a plurality of transponders 4, and transmits the signals from the transmitting apparatus 1 to individual families over carrier waves differing with the transponder. At each family, a receiving apparatus 7 receives via a receiving antenna 6 signals transmitted from the satellite 3.

Figure 2:
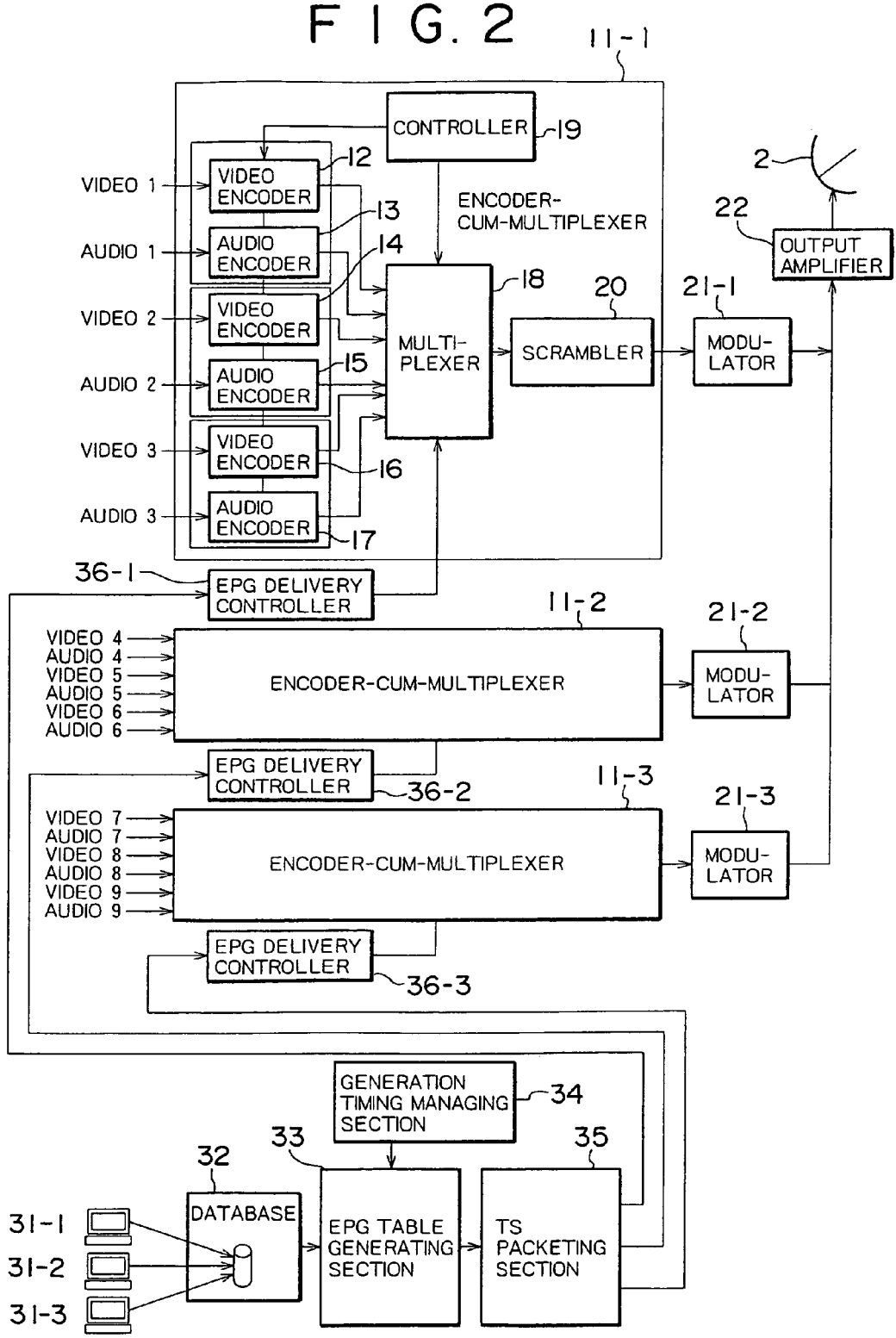
FIG. 2 is a block diagram illustrating an example of configuration of the transmitting apparatus in FIG. 1.
Figure 3:
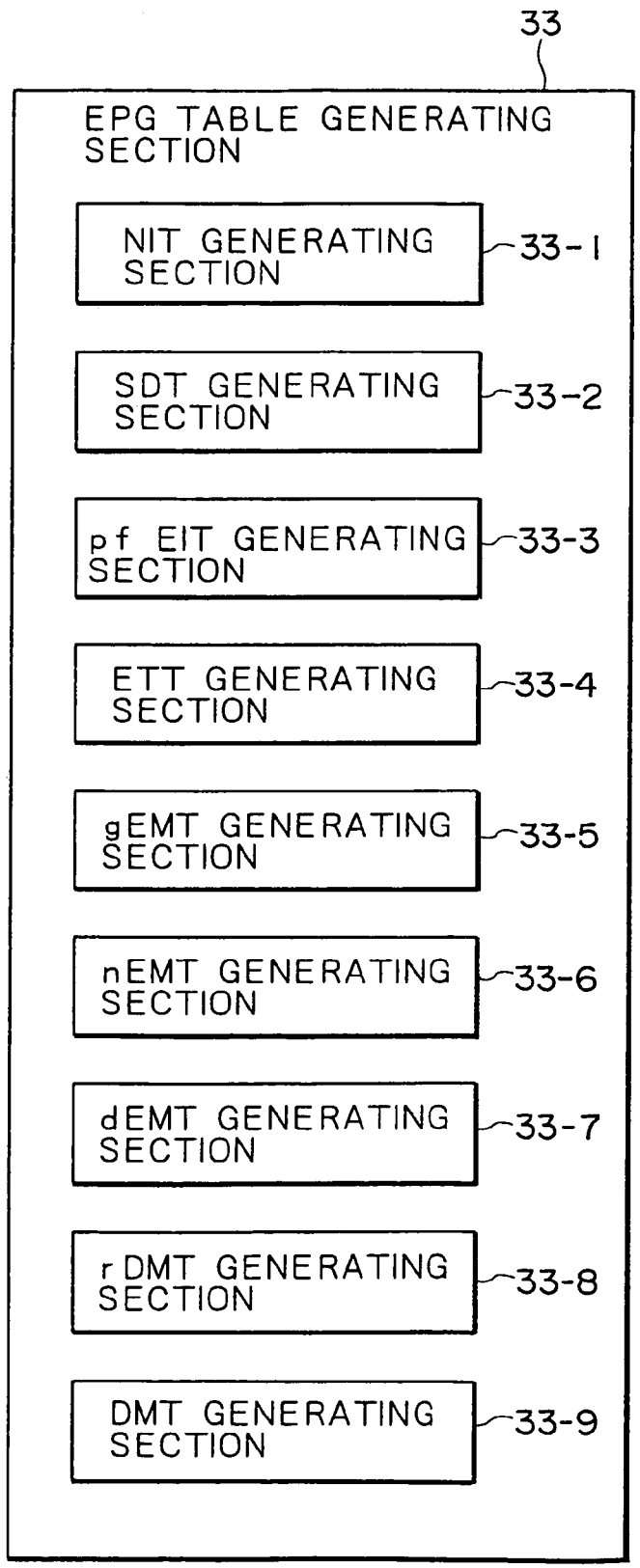
FIG. 3 is a block diagram illustrating an example of configuration of the EPG table generating section in FIG. 1.

FIG. 2 illustrates an example of configuration of the transmitting apparatus 1. An encoder-cum-multiplexer 11-1 has video encoders 12, 14 and 16 and audio encoders 13, 15 and 17. The video encoders 12, 14 and 16 are so disposed as to encode respectively inputted video signals by the MPEG2 system, and to output them to a multiplexer 18. The audio encoders 13, 15 and 17 are so disposed as to encode inputted audio signals by the MPEG system, and to output them to the multiplexer 18.

A controller 19 is so disposed as not only to control encode processing by the video encoder 12 or the audio encoder 17 but also to control multiplex processing by the multiplexer 18.

A scrambler 20 is so disposed as to scramble multiplexed signals supplied from the multiplexer 18, and to output them to a modulator 21-1.

Encoder-cum-multiplexers 11-2 and 11-3 are similarly configured to the encoder/cum-multiplexer 11-1.

It is so disposed that EPG information inputted at EPG input terminals 31-1 to 31-3 is accumulated as raw data in a database 32. An EPG table generating section 33 is so disposed as to generate EPG tables from the raw data accumulated in the database 32, and to output them to a TS packeting section 3. A generation timing managing section 34 generates a prescribed timing signal, and outputs it to the EPG table generating section 33.

In the EPG table generation section 33 are provided generating sections 33-1 to 33-9 for generating individual tables. An NIT generating section 33-1 generates NIT; an SDT generating section 33-2, SDT; a pfEIT generating section 33-3, pfEIT; an ETT generating section 33-4, ETT; a gEMT generating section 33-5, gEMT; an nEMT generating section 33-6, nEMT; a dEMT generating section 33-7, dEMT; an rDMT generating section 33-8, rDMT; and a DMT generating section 33-9, DMT.

EPG delivery controllers 36-1 to 36-3 are so disposed as to supply EPG data in respective tables, supplied from the TS packeting section 35, to the multiplexers of the corresponding encoder-cum-multiplexers 11-1 to 11-3.

Modulators 21-1 to 21-3 FEC-encode (FEC=Forward Error Correction) as well as QPSK-modulate streams supplied from the corresponding encoder-cum-multiplexers 11-1 to 11-3, and output them to an output amplifier 22. The output amplifier 22 is so disposed as to amplify the modulated signals supplied from the modulators 21-1 to 21-3, and to output them toward the satellite 3 via the transmitting antenna 2.

In this example of configuration, each of the encoder-cum-multiplexers 11-1 to 11-3 uses one transponder 4 of the satellite 3. Therefore, in this example of configuration, video signals are distributed to individual families via a total of three transponders.

Thus, in the encoder-cum-multiplexer 11-1, the video encoders 12, 14 and 16 encode video signals for three channels. Also, the audio encoders 13, 15 and 17 encode audio signals respectively corresponding to the video signals. For instance, the video encoder 12 encodes a first video signal by the MPEG2 system, and outputs it to the multiplexer 18. The audio encoder 13 encodes an audio signal corresponding to the video signal inputted to the video encoder 12 by the MPEG system, and outputs it to the multiplexer 18. Similarly, the video encoders 14 and 16 and the audio encoders 15 and 17 also encode video signals and audio signals on their respective channels, and output them to the multiplexer 18. The controller 19 controls encode processing by the video encoders 12, 14 and 16 and the audio encoders 13, 15 and 17.

The multiplexer 18 multiplexes the outputs of the video encoders 12 to the audio encoder 17 under the control of the controller 19.

In the encoders 11-2 and 11-3, too, similar processing to that in the aforementioned encoder 11-1 takes place.

As the video signals and the audio signals are digitally compressed by the respective encoders, it is made possible to ensure effective utilization of the transmission paths.

From the EPG input terminals 31-1 to 31-3, network information corresponding to NIT, channel information corresponding to SDT, program information corresponding to pfEIT, ETT and EMT, message information corresponding to DMT and the like are inputted, and accumulated in the database 32 as raw data. The EPG table generating section 33, on the basis of a timing signal supplied from the generation timing managing section 34, searches for raw data for the tables to be generated (tables including NIT, SDT, pfEIT, ETT, EMT and DMT), and prepares the tables.

The tables which are prepared are TS-packeted (TS=Transport Stream) by the TS packeting section 35, and supplied to EPG delivery controllers 36-1 to 36-3.

As will be described in further detail later, of the tables, dEMT supplies the same data reiteratively in, for instance, 4-second cycles. Other tables (NIT, SDT, pfEIT, ETT, gEMT, nEMT, rDMT and DMT) supply the same data reiteratively in 1-second cycles.

The EPG delivery controller 36-1 supplies the data of the supplied tables to the multiplexer 18. The multiplexer 18, under the control of the controller 19, multiplexes the encoded video signals and audio signals, and further the EPG packet supplied from the EPG delivery controller 36-1, and output them serially.

The scrambler 20, after scrambling the data supplied from the multiplexer 18, outputs them to the modulator 21-1. The modulator 21-1 FEC-encodes the inputted data, and further QPSK-modulates them. And it supplies the modulated signals to the output amplifier 22. The output amplifier 22 amplifies the inputted data, and transmits them toward the satellite 3 via the transmitting antenna 2.

Similar processing also takes place in the encoder-cum-multiplexers 1-2 and 11-3 and the modulators 31-2 and 21-3.

The transport stream outputted from the encoder-cum-multiplexer 11-2 is received by the antenna 5 of the satellite 3, processed by a first transponder out of the transponder 4, and distributed to families over a first carrier wave from the antenna 5. Similarly, signals of bit streams transmitted from the encoder-cum-multiplexers 11-2 and 11-3 are received by the antenna 5, respectively processed by second and third transponders out of the transponders 4, and distributed to families over second and third carrier waves via the antenna 5.

Figure 4:
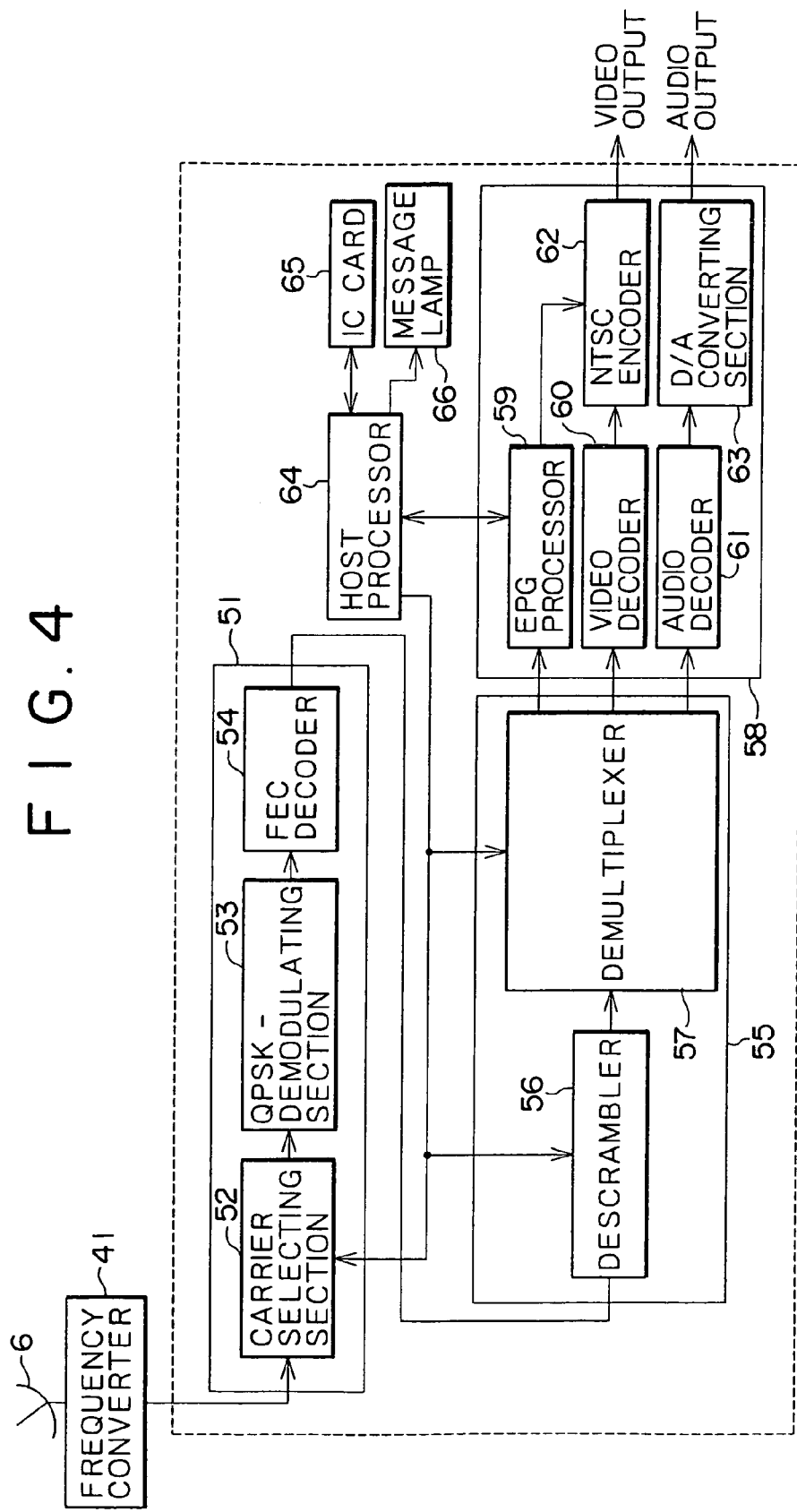
FIG. 4 is a block diagram illustrating an example of configuration of the receiving apparatus in FIG. 1.

FIG. 4 illustrates an example of detailed configuration of the receiving apparatus 7. A frequency converter 41 is so disposed as to convert signals on a prescribed carrier wave, supplied from the receiving antenna 6, into signals of an intermediate frequency, and to output them to the front end section 51. The front end section 51 has a carrier selecting section 52, a QPSK-demodulating section 53 and an FEC-decoder 54. The carrier selecting section 52 is so disposed as to select signals on a carrier wave of a prescribed frequency out of the intermediate frequency signals inputted from the frequency converter 41, and to output them to the QPSK-demodulating section 53. The QPSK-demodulating section 53 is so disposed as to QPSK-demodulate the signals inputted from the carrier selecting section 52, and to output them to the FEC-decoder 54. The FEC-decoder 54 FEC-processes the inputted signals, and outputs them to a transport section 55.

The transport section 55 is so disposed, after descrambling the output of the FEC decoder 54 with a descrambler 56, as to output it to the demultiplexer 57. The demultiplexer 7 separates a plurality of sets of video data or audio data contained in the TS packet and the EPG data. This demultiplex processing is controlled by a host processor 64. The demultiplexer 57 is so disposed as to demultiplex the signals inputted from the descrambler 56, and to output the video data to a video decoder 60, the audio data to an audio decoder 61, and the EPG data to the EPG processor 59.

The audio decoder 61 is so disposed as to decode the inputted audio data by the MPEG system, and to output them to a D/A-converting section 63. The D/A-converting section 63 D/A-converts the audio data inputted from the audio decoder 61, and outputs them to a loudspeaker or the like not shown.

The video decoder 60 decodes the inputted video data by the MPEG2 system, and outputs them to an NTSC-encoder 62. The NTSC-encoder 62 is disposed as to convert the inputted video data into video signals of the NTSC system, and to output them.

The EPG processor 59 is so disposed as to supply, in response to an instruction from the host processor 64, the contents of the EPG data to the host processor 64, at the same time to generate data for on-screen displaying, and to output them to the NTSC-encoder 62.

In an IC card 65 are recorded information for conditional access and the like, and the host processor 64 is so disposed as to control, in response to the information stored in this IC card 65, a descrambler 56 to have it execute scramble processing. A message lamp 66 drives the host processor 64 as required.

Next will be described its operation. The frequency converter 71 converts signals received by the receiving antenna 6 into signals of a prescribed intermediate frequency, and outputs them to the front end section 51. The host processor 64 controls the carrier selecting section 52 in response to an instruction from the user to have it choose a carrier wave of a prescribed frequency. Thus, signals on a carrier outputted by a prescribed transponder are selected by the carrier selecting section 52, and supplied to the QPSK-demodulating section 53. The QPSK-demodulating section 53 QPSK-demodulates entered signals, and outputs them to the FEC decoder 54. The FEC decoder 54 FEC-processes the inputted signals, and outputs them to the descrambler 56.

The host processor 64, where the program on the channel whose reception has been instructed by the viewer is scrambled, reads out information concerning conditional access stored in he IC card 65, and controls the descrambler 56 in response to that information. Thus, where conditional access is allowed, the descrambler 56 descrambles the scrambled TS packet inputted from the FEC decoder 54, and outputs it to the demultiplexer 57. Where conditional access is not allowed, the host processor 64 forbids the descrambler 56 from executing descrambling. As a result, in effect, the viewer cannot watch that program.

The demultiplexer 57, in response to an instruction from the host processor 64, extracts a video packet on 1 designated channel out of programs on 3 channels included in 1 carrier and the data of an audio packet corresponding to it, and outputs them to the video decoder 60 and the audio decoder 61, respectively. The video recorder 60 decodes the data in the inputted video packet by the MPEG2 system, and outputs them to the NTSC-encoder 62. The NTSC-encoder 62 converts the inputted video data into video signals of the NTSC system, supplies them to a display not shown, and causes it to be displayed. The audio decoder 61 decodes the inputted audio data by the MPEG system, and outputs them to the D/A-converting section 63. The D/A-converting section 63 D/A-converts the inputted data, and outputs them to a loudspeaker not shown.

The demultiplexer 57, where EPG data are included in the data supplied from the descrambler 56, extracts them, and outputs them to the EPG processor 59. The EPG processor 59, in response to an instruction from the host processor 64, processes these EPG data, generates data to be displayed on screen as required, and outputs them to the NTSC-encoder 62. The NTSC-encoder 62 superimposes the on-screen data inputted from the EPG processor 59 over the video signals of the NTSC system generated correspondingly to the video data supplied from the video decoder 60, and outputs them. A program scheduled is thereby displayed, superimposed on received pictures, as required. Next, details of the tables constituting an EPG will be further described. FIG. 5 shows a format for use when various tables constituting an EPG are to be transmitted. As shown in the figure, in this format, a table is divided into any desired number of sections and transmitted. Data in the sections of the desired number prescribed here are reiteratively transmitted in either 1-second or 4-second cycles.

Each section is composed of a header and any desired number of information units. The maximum length of 1 section is supposed to be 4096 bytes.

At the leading edge of the header is arranged a "table_id" denoting the kind of the table. This "table_id" is supposed to be 0×40 for NIT, 0×42 or 0 46 for SDT, 0×4e or 0×4f for pfEIT, 0×A2 or 0×A3 for ETT, 0×A4 for gEMT, 0×A5 for nMET, 0×A7 for dEMT, 0×92 for DMT and 0×93 for rDMT.

Next to the "table_id", the length of the section including this header is expressed as "section_length" in bytes. The maximum value of the section length is determined in advance for each kind of table.

Next to the "section_length" is arranged a "table_id_extension". A plurality of tables having the same "table_id" are generated. For instance, an SDT is generated for each stream; a pfEIT and an ETT, for each channel; and an EMT, for each dummy service. Then, to distinguish them from one another, the "table_id_extension" is used. Thus, here is stated, for example, the stream number in the case of SDT, or the channel number in the cases of pfEIT and ETT.

Next is arranged "version_number". Here is stated the version number when the table is updated. Where any of the information units is revised, the receiving apparatus 7 is notified of the revision in contents by incrementing this "version_number".

Next to the "version_number" is arranged a "section_number". Here is stated the number of the section to which that header belongs. This number denotes the position of that section in the overall numerical sequence. As the maximum length of a section is determined in advance, when it is necessary to write in data beyond this maximum length, the data are stated divided into a plurality of sections. The section number begins from 0, and increments by 1 at a time up to a maximum of 255. Where division into sections is done, the headers of individual sections differ only in this "section_number", and are the same in other respects as those of the corresponding sections.

Next to the "section_number" is arranged a "last_section_number". Here is stated the final "section_number" of the table.

In each information unit of the information statement part, 1 piece of channel information is stated in the case of SDT; 1 piece of program information in the cases of pfEIT and EMT; 1 message in the case of DMT; and event information for 1 day in the case of ETT.

FIG. 6 schematically illustrates the contents of the tables constituting an EPG and their data quantities. In an NIT (Network_Information_Table), the overall configuration of the network and necessary information for reception are stated. One NIT is provided in each network.

In an SDT (Service_Description_Table) is stated service information. This SDT is prescribed for each stream.

In a pfEIT (present_followingEvent_Information_Table) is stated information on the present program and the next program. This pfEIT is prescribed for each channel.

In an ETT (Event_Time Table) are stated the "event_id" (program identification sign) and the broadcast start time of every program and the section number of the gEMT to be referred to.

In a gEMT (general-Event_Material_Table) is stated other event information than NVOD. This gEMT is prescribed for each dummy service.

In an nEMT (near-video-on-Demand_Event_Material_Table) is stated NVOD event information. This nEMT is prescribed for each dummy service on an NVOD channel.

While a gEMT and an nEMT are thus distinguished from each other and information on events other than NVOD or information on NVOD events is to be stated in each, the two may as well be unified into a common EMT and, if an NVOD event is to be stated in it, a flag indicating that the statement is a statement concerning NVOD may be stated.

In a dEMT (detail-Event_Material_Table) is stated an event outline document. This dEMT is prescribed for each dummy service.

In an rDMT (reference-Digital Message Table) is stated an index to a message. And the message is stated in "DMT".

As shown in FIG. 6, the data quantity of an NIT is smaller than the data quantity of an SDT. A pfEIT and an ETT have smaller data quantities than a gEMT. A dEMT, as it is intended to state an event outline document, has a considerably larger data quantity than a gEMT or an nEMT.

An rDMT, as it is a mere index to a message, has a data quantity smaller than a DMT and only slightly larger than an NIT. A DMT, though having a greater data quantity than an rDMT, has a smaller data quantity than a gEMT or an nEMT.

FIG. 7 illustrates relationships of reference among different tables. In the NIT, in which the overall configuration of the network and necessary information for reception are to be stated, a plurality of SDTs to be referred to are stated. One such SDT is prescribed for each carrier wave (transponder), in other words, for each stream. Each SDT includes the channel (ch) contained in that stream and the dummy channel (d-ch) corresponding thereto. What a viewer can actually select is only real channels, but no dummy channel can be selected. In a real channel, a pfEIT and an ETT are provided corresponding to each other, and in a dummy channel, a gEMT and a dEMT corresponding thereto are provided.

In a pfEIT, information on the program broadcast at present on that channel and the program to be broadcast next is stated. In an ETT, a gEMT and a dEMT (schedule table), information is stated as illustrated in FIG. 8.

Figure 8:
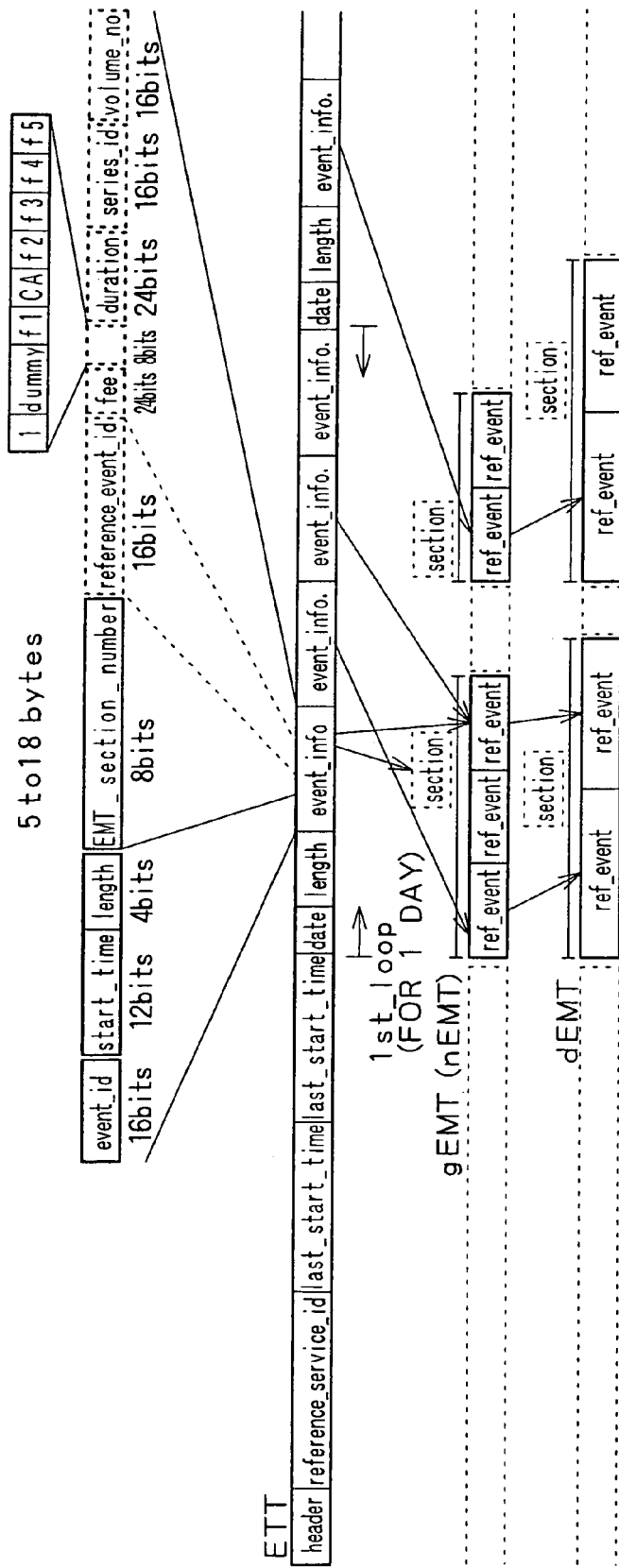
FIG. 8 is a diagram for explaining the reference relationship between the ETT and the EMT.

Thus, as shown in FIG. 8, in an ETT, a header is arranged at its leading edge, and next to it is arranged a "reference_service_id". A "service" (corresponding to a so-called channel) consists of a plurality of consecutive events, and the "service_id" is the identification code of this "service", which is "network_id_unique". This is supposed to be a "service_id" in a real service, but a "reference_service_id" in a dummy service. The "reference_service_id" prescribed in this ETT represents the "reference_service_id" of the EMT to be referred to.

A "first_start_time" expresses in bytes the "start_time" of the earliest in "start_time" (broadcast start time) out of the events included in that section, and the "last_start_time" denotes the "start_time" of the latest in "start_time" of the events included in that section.

A loop represents the extent to which 1 day's program table is stated, and a "date" indicates the date of the broadcast start of events included in that day's loop. The "length" indicates the length of this loop.

Further next to that, an "event_info" is stated as many times as the number of programs broadcast on that day.

The first "event id" of each "event_info" denotes the identification code of that program. A "start_time" denotes the broadcast start time of that program. A "length" denotes the length of that "event_info" at and after the next "EMT_section_number".

In an "EMT_section_number", the "section_number" of the EMT in which common information of that event is written is stated. Thus, as individual information of the program is stated in the ETT, the "section_number" of the EMT in which common information to be referred to is stated here. In a "reference_event id", the "reference_event_id" of the dummy event in which common information is stated is stated. The dummy service, which is a virtual service for stating common service information and stating the EMT, has "reference_service_id". A dummy event means an artificial event included in a dummy service for detecting the EMT. A "reference_event_id" is the "event_id" of a dummy event.

Thus, an "EMT_section_number" designates the section of a gEMT (or an nEMT) to be referred to, and a "reference_event_id" designates a dummy event in that section.

A "fee" states the fee for viewing that program (event). The 8 bits following the "fee" represent a flag, of which f1 is made "1" when the CA of the next 1 bit is valid or "0" when it is invalid. The next CA is a flag indicating whether "conditional access" is valid or invalid. The next f2 indicates whether or not a duration is prescribed in this ETT; f3, whether or not a "series_id" is prescribed in this ETT; and f4, whether or not a "volume_no" is prescribed in this ETT.

A "duration" indicates the length of the "event". A "series_id" is the identification sign of that event. A "series" means a set of specific "event"s over the "service".

A "volume_no" indicates the "volume" of the "event". For instance, where the "event" is a drama or the like and one of a series of "events" consisting of first, second, third, installments, it indicates which installment the particular event is.

In a gEMT (or an nEMT) referred to in such an ETT is stated information other than the outline document of the "event" stated in a dEMT, and in the dEMT referred to in the gEMT (or the nEMT) is stated the outline document of that "event".

To add, in the gEMT (or the nEMT) is also stated the category of that "event".

As illustrated in FIG. 7, in the case of an ordinary channel (not an NVOD channel), one each of ETT, gEMT and dEMT is present on 1 channel.

By contrast, on an NVOD channel, an ETT is prescribed for each channel on which pictures of various timings of NVOD are to be distributed, and each ETT refers to the nEMT of a dummy channel. In this case, the dummy channels corresponding to the respective real NVOD channels are made common. And one each of nEMT and dEMT is prescribed.

As illustrated in FIG. 8, the common "reference event id" of a gEMT (or an nEMT) can be referred to by a plurality of "event_info's" of an ETT. In this respect, as shown in FIG. 16, there is a difference from the prior art according to which a "gEIT" and a "dEIT" were individually readied for each real channel. Therefore, in this mode of implementation, since different "events" can refer to the same gEMT, the quantity of data to be transmitted can be that much reduced. Especially in multi-channel broadcasting, the same program is often broadcast repeatedly. In such a case, different ETTs would frequently refer to the same gEMT. Therefore, the quantity of data to be transmitted can be that much reduced.

Also in this mode of carrying out the present invention, the ETT shown in FIG. 8 transmits, for instance, a program schedule for 1 week in a plurality of consecutive sections. As the maximum length of 1 section is 4096 bytes, sufficiently greater than the 188-byte pack length of a transport stream of MPEG2, no program schedule according to the prior art in which some programs are in effect absent as a result of division into 3-hour segments would arise, eliminating the need to transmit data in vain. Therefore, this aspect, too, helps to save the quantity of data to be transmitted.

Furthermore, the following circumstance also serves to reduce the quantity of data transmitted. Thus, where the "event" is an installment of a serial program as mentioned above, there are many duplications, as shown in FIGS. 9A and 9B, between the introductory message for the first installment of the program (FIG. 9A) and the introductory message for the second installment of the program (FIG. 9B). The title of the program and an introductory message for it are stated in a "name_descriptor" and a "content_descriptor" in the EMT. In the mode of carrying out the invention, an "add name_descriptor" and an "add_content_descriptor" are further added to these. And, as stated above, because this is a serial program, a "volume_number" is prescribed in the ETT for stating the "event_id of the real event and the "start_time" of the "event". There the position of the installment in the serial program is stated in this "volume_number".

Figure 10:
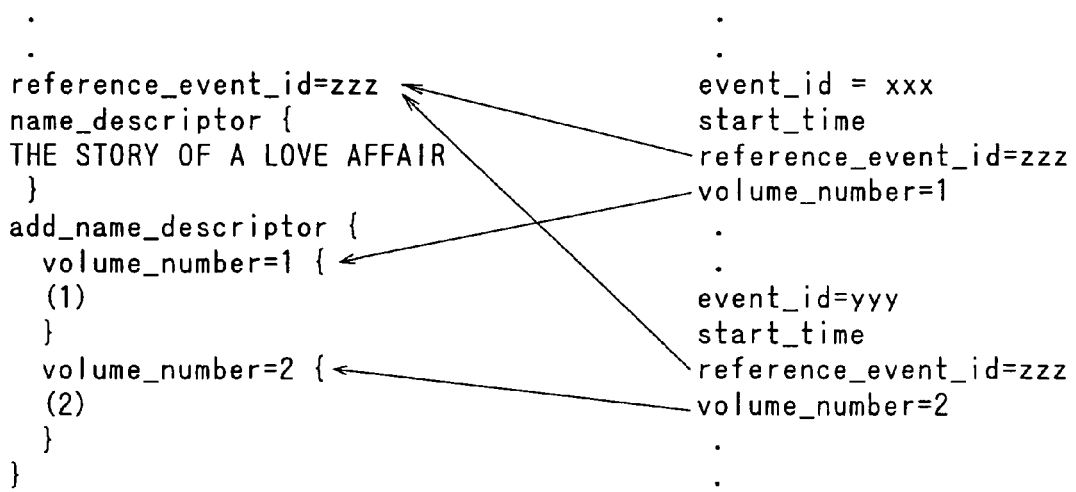
FIG. 10 is a diagram for explaining an application of "volume_number".

The EPG processor 59 of the receiving apparatus 7, where a "volume_number" is present in the ETT, effects control so as to add the sentence of the corresponding "volume_number" in the add_name_descriptor" to the title stated in the name_descriptor" of the "EMT2 referred to and to display it. As a result, for instance by stating as shown in FIG. 10, the character "(1)" or "(2)", indicating which installment of the program it is, is added after the title. "The Story of a Love Affair", and is displayed.

Similarly, the EPG processor 59 adds the sentence of the corresponding "volume_number" in the "add_content_descriptor" to the content of the "content_descriptor" of the EMT and displays it. By this addition, next to the introductory message "Introductory message: In 8 installments. A work comically expressing the moves of a young woman's emotion. What will be the outcome of her love?", the sentence "The man who has suddenly appeared before Yukie . . . " is inserted for the first installment, and the sentence "Yukie suddenly meets him again. Then Yukie . . . " is inserted for the second installment and is displayed.

By doing so, the need to duplicate the common sentence in transmission is eliminated, and the efficiency of transmission can be enhanced.

Further in this mode of carrying out the invention, quicker retrieval is made possible. Thus, in the case of this mode of carrying out the invention, the program schedule is not divided into time segments, but the table is divided into an ETT stating the "event_id"s and start times of programs for a week and the section numbers of the gEMT to be referred to, and an EMT stating information on "event"s, and the program schedule for a week is stated in the ETT. Although the time range of the program schedule contained in the ETT is long, the data quantity of the ETT itself is small because information on substantive contents of "event"s is recorded in the EMT, and accordingly retrieval can be quickly accomplished.

Necessary information on the retrieved program is read out of the ENT as appropriate.

Further according to the present invention, as information on NVOD channels is stated in NEMT, it is possible, for instance, to retrieve and display only NVOD programs. In this case, the EPG processor 59 retrieves the nEMT, reads out the titles of "event"s stated there, and causes them to be displayed as, for example, illustrated in FIG. 11. Since only the NEMT is searched (the gEMT is not searched) at this time, fast retrieval is made possible. For this search, it is to be stated in advance the genre of each program and the pronunciation of the title of each program. In this way, it is made possible to search titles by genre and display the retrieved titles in the order of the Japanese syllabary.

Incidentally, if the genres and pronunciations of the titles of programs are stated in the gEMT as well, ordinary programs can be searched by genre and displayed in the order of the Japanese syllabary.

Furthermore, it is also possible to state an NVOD code in the nEMT. In this way, even where NVOD service is provided over different carrier waves (transponders), it is possible to prevent things like displaying the same title doubly.

Thus, the EPG processor 59. if an NVOD code is stated, assumes that the program belongs to a common NVOD, and omits the displaying of its title. The "reference_event_id" is unique within the same carrier, and on a different carrier, even if the "reference event_id" is the same, basically a different dummy event will be designated. Therefore, by this NVOD code, the fact of being the corresponding NVOD is designated.

Also in this mode of carrying out the invention, it is possible to retrieve the broadcast start times of all the prescribed NVOD programs from the ETT on the basis of the "reference_event_id" of a dummy event retrieved by the nENT. FIG. 12 illustrates an example of displaying in this case. This example of displaying shows an instance in which a program entitled "Giant" is broadcast every hour from 18:00 on. This retrieval can also be made at high speed.

Further in this case, it is possible to provide in the nEMT a part in which to state the "start_time" of a dummy event, and state the start time of the final run out of the start times of NVOD. In this way, that statement would make possible detection of the broadcast start time of the final run.

In the ETT, as an item of "fee" is provided and fee charging information is stated there, if the charge differs with the broadcast time, this can also be displayed at the same time.

Further in this mode of carrying out the invention, fast searching and, accordingly fast access is made possible for the following reason, too. Thus, in the ETT, the start time of the program and the section number in the EMT where information on that program is stated are stated. Since the quantity of information in the ETT can be made smaller than in the EMT by nearly 2 digits, even if data for 2 weeks are written in, the capacity can be comparatively small. Therefore even if for instance, this ETT is to be stored within the receiving apparatus, the capacity of the memory can be small. Or even if it is not stored, access will be easy.

In this mode of carrying out the invention, fast retrieval is made possible for the following reason as well. Thus, in the case of a rebroadcast program, all the common information on that program is stated in the EMT, and individual information is stated in the ETT. Therefore, the EMT would be smaller in data quantity than where the original event is wholly stated. Also, it is made possible to arrange main pieces of event information (EMT) without duplication (the same piece of event information will not be doubly retrieved from different tables), and to achieve faster retrieval. Duplicated displaying of a rebroadcast is also prevented.

Also in this mode of carrying out the invention, a program referring to the same EMT, for instance, is assumed to be a rebroadcast program, and it is also possible to detect only rebroadcast programs.

Incidentally, information on the reception fee and the like (CA) stated in the ETT can be stated in the EMT as well. The EPG processor 59 gives priority to information in the ETT if CA is stated in both the EMT and the ETT.

Furthermore, genre information can be stated not only in the gEMT (or the nEMT) but also in the SDT. In multichannel broadcasting, the genre of programs to be broadcast is often fixed to some extent for each channel, such as specializing in sports, specializing in news or specializing in music. Then, by stating a number of genres in the SDT as information incidental to the channel, it is made possible, when searching by genre, to retrieve the channel of the same genre as the genre to be searched and further search programs only on that channel, thereby narrowing the range of searching and substantially shortening the searching time.

Figure 13:
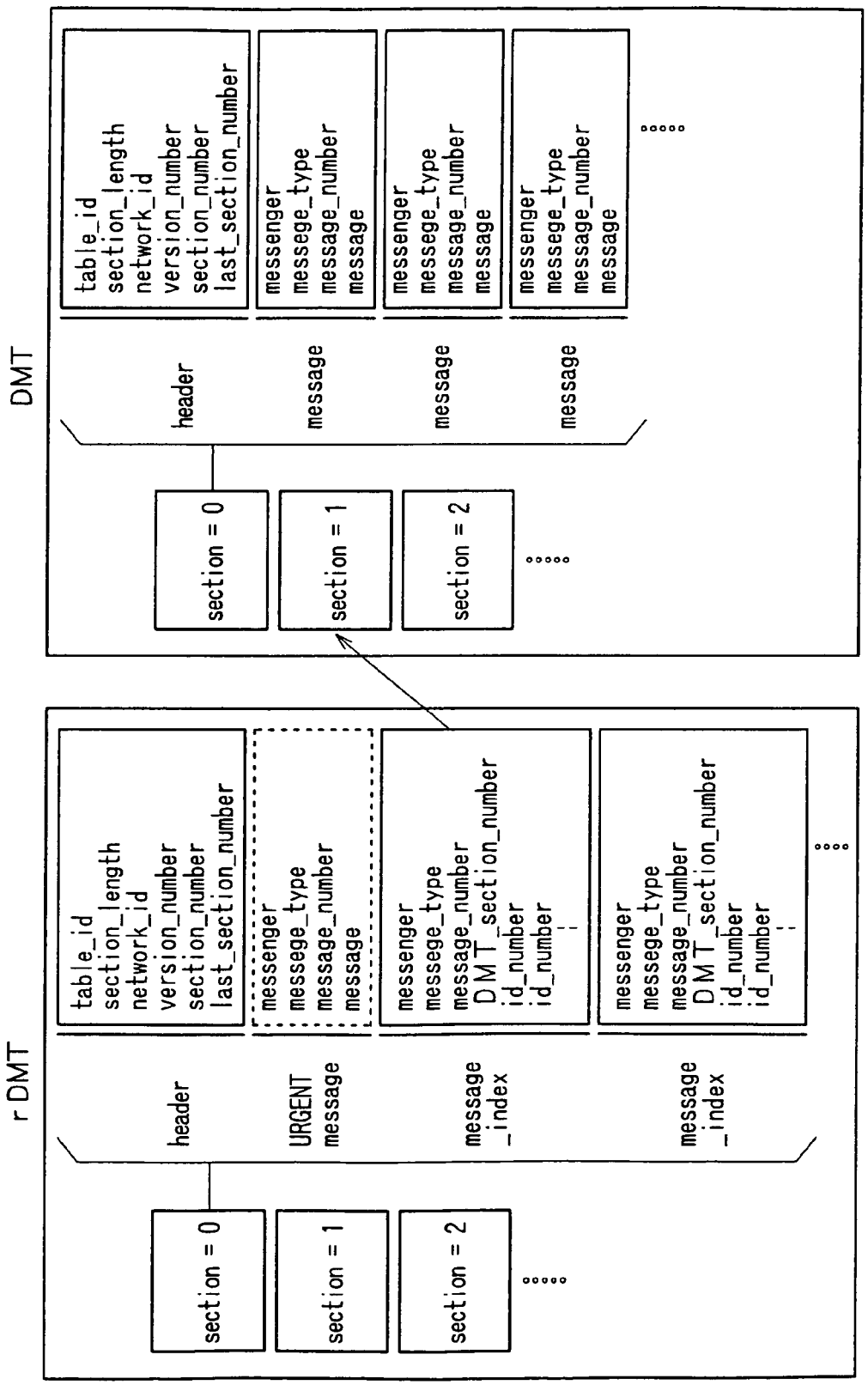
FIG. 13 is a diagram for explaining the rDMT and the DMT.

Next will be explained the rDMT and the DMT with reference to FIG. 13. As illustrated in FIG. 13, the DMT is also divided into sections, and in its "header" are registered such items as were described with reference to FIG. 5. However, as "table_id_extension" out of them, the "network_id" is registered. This "network_id" is the identification code of the network.

Next to the "header", a block of "messages" follows. In each "message" are registered a "messenger" indicating the originator of the message, a "message_type" indicating the level or the attribute of the message, a "message number" which is the identification number of the message, and a "message" as content of the message.

By contrast, in the rDMT, basically as many "message indexes" as required are inserted next to the "header".

In these "message_indexes" are recorded a "messenger" indicating the originator of the message, a "message_type" indicating the level or the attribute of the message, and a "message_number" which is the number of the message. Further, into these "message_indexes" is inserted a "DMT_section_number", where the section number of the DMT to be referred to (to which a corresponding message exists) is registered.

Also in the "message_index", the "id_number" of the provider of the program as originator of the message, the "id_number" of the provider of the receiving apparatus and the like are recorded.

Further into the rDMT, an urgent message to be transmitted, if any, is inserted. Thus, while an ordinary message is inserted into the DMT, an urgent message is registered in the rDMT in which essentially only indexes are registered.

Into the DMT, a total of 1024 messages can be inserted, As the maximum number of sections for transmission of a table is 256 and the maximum length of 1 section is 4096 bytes, the total data quantity of messages is 1 Mbyte (=4096 bytes×256). Then, the maximum capacity per message being supposed to be 400 bytes, a total of 1024 messages can be transmitted.

Figure 14:
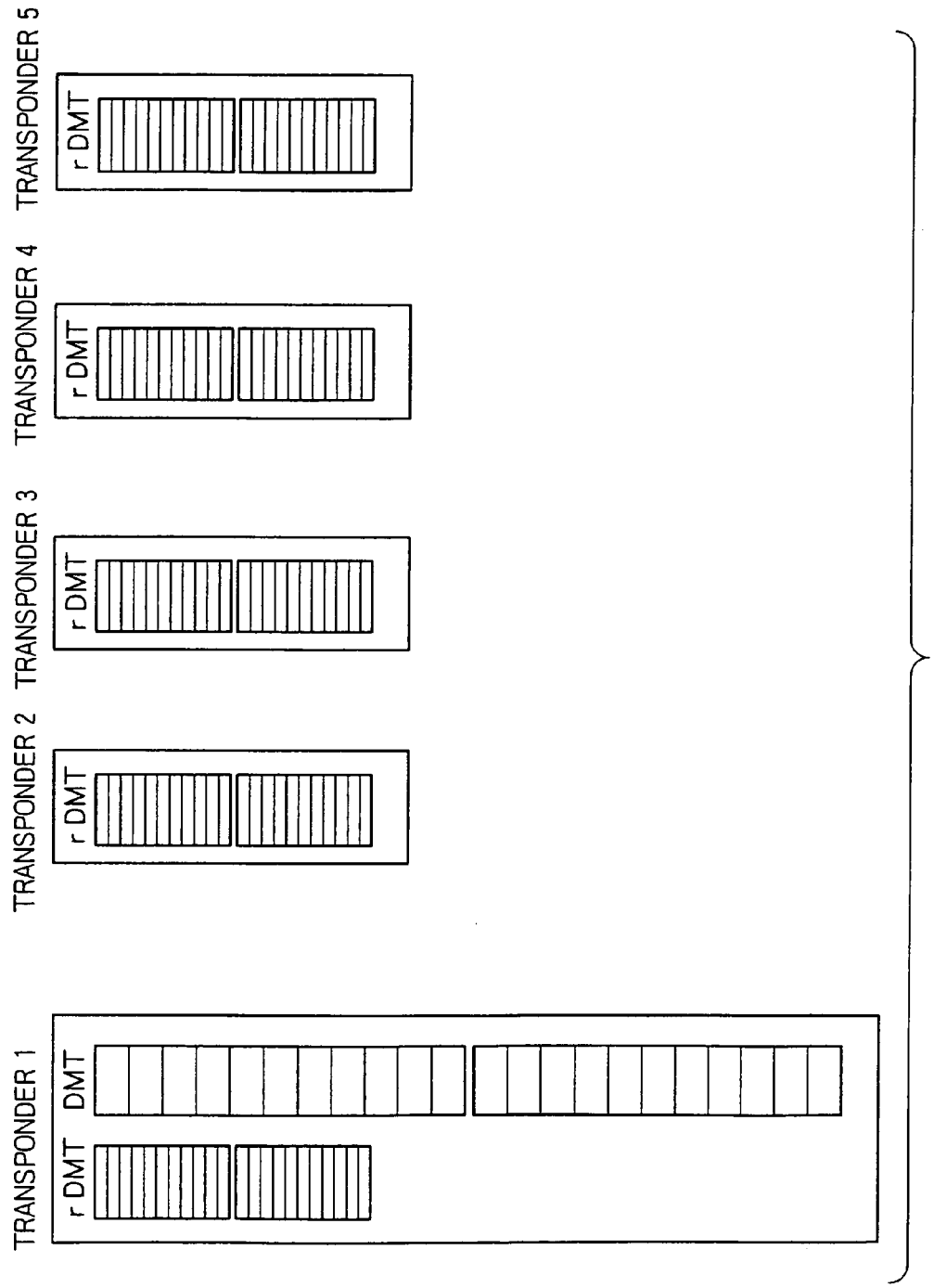
FIG. 14 is a diagram for explaining the relations of rDMT and DMT to transponders.

Since a DMT containing messages thus becomes a considerably large table, as illustrated in FIG. 14, it is inserted only into the stream corresponding to 1 transponder representative of a plurality of transponders (transponder 1 in the case of the example of FIG. 14). And an rDMT is inserted into every stream corresponding to one of another of the transponders. Therefore, a stream corresponding to whichever transponder each receiving apparatus may be receiving, any urgent message contained in the rDMT can be immediately received. In order to receive any other ordinary message, the stream of transponder 1 should be received.

If a DMT were inserted into the stream of every transponder, as its data quantity is large, the capacity for the transmission of video signals as such would be that much lost. Therefore, in this way, a DMT is inserted only into the stream of a predetermined transponder.

Since the capacity of an rDMT is not so great, even though it is inserted into the stream of every transponder, the capacity for the transmission of video signals as such is hardly lost. And as it is so disposed that index information on the DMT into which messages are inserted is recorded in this rDMT, the viewer, even if he or she is receiving the stream of a transponder not containing the DMT, can know the generation of a message without delay and, as required, read it as appropriate. And any urgent message, the stream of whichever transponder may be being received, can be immediately read.

Since an urgent message is not frequently generated, usually the capacity for the transmission of video signals as such and the like is rarely lost.

As, in this manner, a dedicated DMT for the transmission of messages and an rDMT are ready, not only the network manager but also the program provider having the channel is enabled to transmit as appropriate such messages as an announcement of a special program, a notice of a campaign and a guide on the program viewing method.

Further, it is also made possible, by utilizing these messages, to readily inform the audience of a notice on downloading to replace the operating software of the receiving apparatus, the content of any change or a method.

Figure 15:
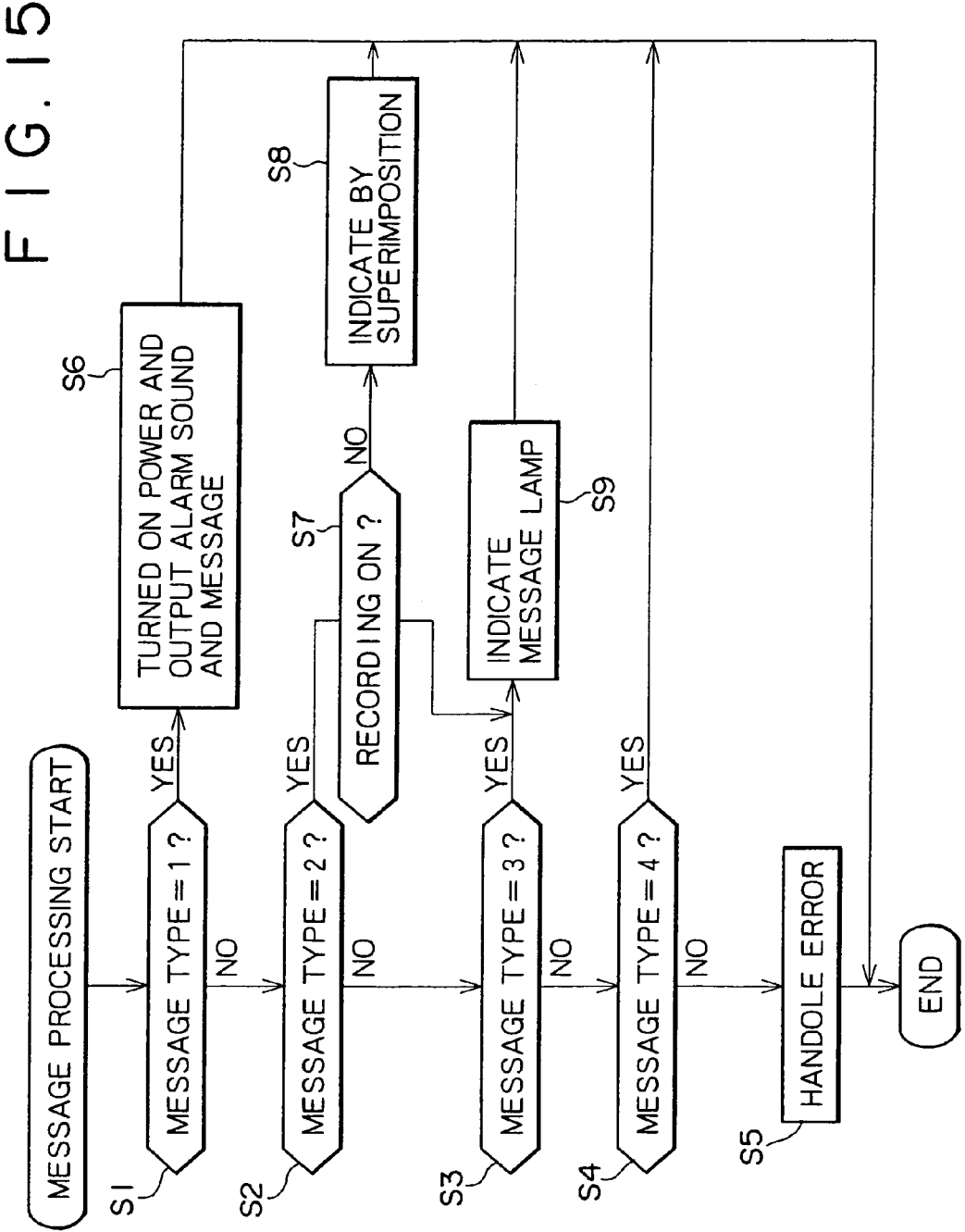
FIG. 15 is a flow chart for explaining message processing by the EPG processor in FIG. 4.

FIG. 15 illustrates an example of message processing accomplished by the EPG processor 59. At step S1 to step S4, it is determined which out of 1 to 4 the "message type" contained in the "message_index" of the rDMT is. If it is determined that the "message type" is none of "1" to "4", error processing takes place at step S5.

If the "message_type" is determined to be "1" at step S1, proceeding to step S6, the EPG processor 59, even if the power supply to the receiving apparatus 7 has been turned off, turns it on, controls the D/A converting section 63 to have an alarm tone issued, at the same time generates data to have the received message displayed on screen, and causes them to be outputted from the NTSC encoder 62. This, in the event of reception of an urgent alarm message, enables every viewer to see and hear this message immediately without fail. Incidentally, this urgent alarm message is what is transmitted, for instance, in time of a disaster or the like.

If the "message_type" is determined to be "2" at step S2, proceeding to step S7, the EPG processor 59 inquires of the host processor 64 whether or not recording operation is taking place at the moment. In response to this inquiry, the host processor 64 supplies the current output of the NTSC encoder 62 to a video tape recorder or the like (not shown) to determine whether or not recording operation is being executed. The result of determination is communicated to the EPG processor 59. The EPG processor 59, if it determines that recording operation is not taking place at the moment on the basis of the notice from the host processor 64, proceeds to step S8, generates data to display the received message on screen, outputs them to the NTSC encoder 62, and causes them to be displayed superimposed on video signals.

If it is determined at step S7 that recording operation is taking place at the moment, proceeding to step S9, the EPG processor 59 requests the host processor 64 to turn on a message lamp. In response to this request, the host processor 64 turns on the message lamp 66. This enables the viewer to know that a message has been transmitted.

The viewer, when he or she has become aware of the generation of a message from the indication of the message lamp 66 and wants to know the content of that message immediately, instructs the host processor 64 to display the message. When this instruction is inputted, the host processor 64 controls the EPG processor 59 and requests the displaying of the message. In response to this request, the EPG processor 59 generates on-screen data of the received message, and supplies them to the NTSC encoder 62 to have them displayed.

Whereas an urgent message, whose "message_type" is "2" is also transmitted by the rDMT in the above-described manner, as its urgency is less than that of an urgent alarm message, this message is immediately displayed unless recording operation is taking place at the moment, but if recording operation is taking place, the message can be checked either immediately or afterwards at the option of the viewer. This prevents the message, superimposed on the video signals being recorded, from being superimposed and, every time the recorded video signals are played back, that superimposed message from being displayed.

If the "message_type" is determined to be "3" at step S3, proceeding to step S9 takes place, and message lamp indication processing is executed. Thus, in this case, as in the case where a message of "message type 2" is received and recording operation is taking place, the viewer can read out the message either immediately or afterwards as required.

However, as messages of and after this "message type-3" are transmitted by the DMT, when the viewer instructs the host processor 64 to receive the message, the host processor 64 will display that message without delay if it is receiving the stream of the transponder containing the DMT, but if it is receiving the stream of the transponder containing no DMT, it will control the carrier selecting section 52 so that the stream of the transponder containing the DMT can be received. Then the DMT is extracted from the received stream, and the message in it will be displayed.

If the "message_type" is determined to be "4" at step S4, processing of step S9 is skipped. Thus, in this case, the message lamp is not turned on. Therefore, the viewer instructs the host processor 64 to indicate a message, spontaneously tries to see the message, and checks if there is any message or not.

Whereas the present invention has been described so far with reference to a case in which information is transmitted via a satellite, the invention can as well be applied to a case in which information is transmitted via a cable, such as in a CATV system.

To add, as transmission media by way of which a program to perform the above-described processing can be transmitted to users, communication media including networks and satellites can be used besides such recording media as magnetic disks, CD-ROMs and solid memories.

As hitherto described, the information providing apparatus, information providing method, and transmission medium, as they are disposed to synthesize EPG information from the first information containing messages and the second information containing indexes to messages, make it possible to transmit many messages while suppressing the effect on video information, which essentially has to be transmitted.

The above-described information receiving apparatus, information receiving method, and transmission medium, as they are disposed to display messages on screen over video information according to the result of determination of the message type, make it possible to prevent video information, on which messages are superimposed, from being recorded on a recording medium.

The above-described information providing system, information providing method, and transmission medium, as they are disposed to synthesize EPG information from the first information containing messages and the second information containing indexes to messages, extract messages from received signals and to display the message on screen over video information, make it possible to transmit and display many messages without seriously affecting essential video information.

What is claimed is:

1. A method of transmitting information, comprising:
   forming a first bit stream including a first data table that includes a first on-screen display message;
   forming a second bit stream including a second data table that includes at least one index which refers to a location of the first on-screen display message within the first data table and that includes a second on-screen display message; and
   transmitting the first bit stream and the second bit stream;
   the presence of the second on-screen display message in the transmitted second bit stream indicating that the second on-screen display message is an urgent message that requires a device that receives the transmitted first bit stream and the transmitted second bit stream to provide notification of the second on-screen display message before displaying the first on-screen display message.

2. The method of claim 1, wherein at least one of the first on-screen display message and the second on-screen display message includes data selected from the group consisting of an originator of the on-screen display message, a level of the on-screen display message, an attribute of the on-screen display message, and an identification number of the on-screen display message.

3. The method of claim 1, wherein the first data table includes a plurality of sections, and the at least one index refers to one of the plurality of sections.

4. The method of claim 3, wherein at least one of the plurality of sections includes a plurality of messages.

5. The method of claim 3, wherein the second data table includes a plurality of indexes each identifying corresponding one of the plurality of sections within the first data table.

6. The method of claim 1, wherein the second data table includes data selected from the group consisting of an originator of the first on-screen display message, a level of the first on-screen display message, an attribute of the first on-screen display message, and an identification number of the first on-screen display message.

7. The method of claim 1, wherein the notification of the second on-screen display message includes displaying the urgent message.

8. The method of claim 1, wherein the first bit stream includes another data table having at least one index which refers to a location of another on-screen display message within the first data table.

9. The method of claim 1, wherein the first bit stream and the second bit stream are transmitted by respective transponders.

10. The method of claim 1, further comprising:
    forming a third bit stream that includes a third data table having at least one index which refers to a location of an associated on-screen display message within the first data table.

11. The method of claim 10, wherein the index within the third data table and the index within the second data table refer to a common on-screen display message location within the first data table.

12. The method of claim 10, wherein the first bit stream, the second bit stream and the third bit stream are each transmitted by respective transponders.

13. An apparatus for transmitting information, comprising:
    an encoder operable to form a first bit stream including a first data table that includes a first on-screen display message;
    a second encoder operable to form a second bit stream including a second data table that includes at least one index which refers to a location of the first on-screen display message within the first data table and that includes a second on-screen display message; and
    an output operable to transmit the first bit stream and the second bit stream;
    the presence of the second on-screen display message in the transmitted second bit stream indicating that the second on-screen display message is an urgent message that requires a device that receives the transmitted first bit stream and the transmitted second bit stream to provide notification of the second on-screen display message before displaying the first on-screen display message.

14. The apparatus of claim 13, wherein at least one of the first on-screen display message and the second on-screen display message includes data selected from the group consisting of an originator of the on-screen display message, a level of the on-screen display message, an attribute of the on-screen display message, and an identification number of the on-screen display message.

15. The apparatus of claim 13, wherein the first data table includes a plurality of sections, and the at least one index refers to one of the plurality of sections.

16. The apparatus of claim 15, wherein at least one of the plurality of sections includes a plurality of messages.

17. The apparatus of claim 15, wherein the second data table includes a plurality of indexes each identifying a corresponding one of the plurality of sections within the first data table.

18. The apparatus of claim 13, wherein the second data table includes data selected from the group consisting of an originator of the first on-screen display message, a level of the first on-screen display message, an attribute of the first on-screen display message, and an identification number of the first on-screen display message.

19. The apparatus of claim 13, wherein the notification of the second on-screen display message includes displaying the urgent message.

20. The apparatus of claim 13, wherein the first bit stream includes another data table having at least one index which refers to a location of another on-screen display message within the first data table.

21. The apparatus of claim 13, wherein the first bit stream and the second bit stream are transmitted by respective transponders.

22. The apparatus of claim 13, further comprising a third encoder operable to form a third bit stream that includes a third data table having at least one index which refers to a location of an associated on-screen display message within the first data table.

23. The apparatus of claim 22, wherein the index within the third data table and the index within the second data table refer to a common on-screen display message within the first data table.

24. The apparatus of claim 22, wherein the first bit stream, the second bit stream and the third bit stream are transmitted by respective transponders.

25. A computer readable storage medium recorded with computer program instructions for carrying out a method of transmitting information, said method comprising:
   forming a first bit stream including a first data table that includes a first on-screen display message;
   forming a second bit stream including a second data table that includes at least one index which refers to a location of the first on-screen display message within the first data table and that includes a second on-screen display message; and
   transmitting the first bit stream and the second bit stream;
   the presence of the second on-screen display message in the transmitted second bit stream indicating that the second on-screen display message is an urgent message that requires a device that receives the transmitted first bit stream and the transmitted second bit stream to provide notification of the second on-screen display message before displaying the first on-screen display message.

26. A method of receiving transmitted information, comprising:
   receiving a first bit stream and a second bit stream;
   forming, from the first bit stream, a first data table that includes a first on-screen display message;
   forming, from the second bit stream, a second data table that includes at least one index which refers to a location of the first on-screen display message within the first data table and that includes a second on-screen display message, the presence of the second on-screen display message in the second data table indicating that the second on-screen display message is an urgent message that requires providing notification of the second on-screen display message before displaying the first on-screen display message;
   reading the second on-screen display message in the second data table;
   providing notification of the second on-screen display message;
   locating the first on-screen display message in the first data table using the index stored in the second data table;
   reading the first on-screen display message; and
   displaying the first on-screen display message after said providing notification of the second on-screen display message.

27. The method of claim 26, wherein at least one of the first data table and the second data table includes data selected from the group consisting of a level of the on-screen display message and an attribute of the on-screen display message, and the on-screen display priority is determined based on the level or the attribute.

28. The method of claim 26, wherein said step of providing notification of the second on-screen display message includes displaying the urgent message.

29. An apparatus for receiving transmitted information, comprising:
   a receiver operable to receive a first bit stream and a second bit stream;
   a processor operable to form, from the first bit stream, a first data table that includes a first on-screen display message and to form, from the second bit stream, a second data table that includes at least one index which refers to a location of the first on-screen display message within the first data table and that includes a second on-screen display message, the presence of the second on-screen display message in the second data table indicating that the second on-screen display message is an urgent message that requires said apparatus to provide notification of the second on-screen display message before displaying the first on-screen display message;
   said processor being further operable to read the second on-screen display message, to provide notification of the second on-screen display message, to locate the first on-screen display message in the first data table using the index stored in the second data table, to read the first on-screen display message, and to display the first on-screen display message after providing notification of the second on-screen display message.

30. The apparatus of claim 29, wherein at least one of the first data table and the second data table includes data selected from the group consisting of a level of the on-screen display message and an attribute of the on-screen display message, and the on-screen display priority is determined based on the level or the attribute.

31. The apparatus of claim 29, wherein said processor is operable to provide notification of the second on-screen display message by being operable to display the urgent message.

32. A computer readable storage medium recorded with computer program instructions for carrying out a method of receiving transmitted information, said method comprising:
   receiving a first bit stream and a second bit stream;
   forming, from the first bit stream, a first data table that includes a first on-screen display message;
   forming, from the second bit stream, a second data table that includes at least one index which refers to a location of the first on-screen display message within the first data table and that includes a second on-screen display message, the presence of the second on-screen display message in the second data table indicating that the second on-screen display message is an urgent message that requires providing notification of the second on-screen display message before displaying the first on-screen display message;
   reading the second on-screen display message in the second data table;
   providing notification of the second on-screen display message;
   locating the first on-screen display message in the first data table using the index stored in the second data table;

reading the first on-screen display message; and displaying the first on-screen display message after said providing notification of the second on-screen display message.

33. A method of delivering information, comprising:

forming a first bit stream including a first data table that includes a first on-screen display message;

forming a second bit stream including a second data table that includes at least one index which refers to a location of the first on-screen display message within the first data table and that includes a second on-screen display message;

transmitting the first bit stream and the second bit stream;

receiving the first bit stream and the second bit stream;

forming the first data table from the first bit stream;

forming the second data table from the second bit stream;

reading the second on-screen display message in the second data table, the presence of the second on-screen display message in the second data table indicating that the second on-screen display message is an urgent message that requires providing notification of the second on-screen display message before displaying the first on-screen display message;

providing notification of the second on-screen display message;

locating the first on-screen display message in the first data table using the index stored in the second data table;

reading the first on-screen display message; and displaying the first on-screen display message after said providing notification of the second on-screen display message.

34. A system for delivering information, comprising:

an apparatus for transmitting the information, including:

an encoder operable to form a first bit stream including a first data table that includes a first on-screen display message, a second encoder operable to form a second bit stream including a second data table that includes at least one index which refers to a location of the first on-screen display message within the first data table and that includes a second on-screen display message, and an output operable to transmit the first bit stream and the second bit stream; and an apparatus for receiving the transmitted information, including:

a receiver operable to receive the first bit stream and the second bit stream, and a processor operable to form the first data table from the first bit stream and the second data table from the second bit stream, the presence of the second on-screen display message in the transmitted second bit stream indicating that the second on-screen display message is an urgent message that requires said apparatus for receiving the transmitted information to provide notification of the second on-screen display message before displaying the first on-screen display message, said processor being further operable to read the second on-screen display message, to provide notification of the second on-screen display message, to locate the first on-screen display message in the first data table using the index stored in the second data table, to read the first on-screen display message, and to display the first on-screen display message after providing notification of the second on-screen display message.

35. A readable computer medium storage recorded with computer program instructions for carrying out a method of delivering information, said method comprising:

forming a first bit stream including a first data table that includes a first on-screen display message;

forming a second bit stream including a second data table that includes at least one index which refers to a location of the first on-screen display message within the first data table and that includes a second on-screen display message;

transmitting the first bit stream and the second bit stream;

receiving the first bit stream and the second bit stream;

forming the first data table from the first bit stream;

forming the second data table from the second bit stream;

reading the second on-screen display message in the second data table, the presence of the second on-screen display message in the second data table indicating that the second on-screen display message is an urgent message that requires providing notification of the second on-screen display message before displaying the first on-screen display message;

providing notification of the second on-screen display message;

locating the first on-screen display message in the first data table using the index stored in the second data table;

reading the first on-screen display message; and displaying the first on-screen display message after said providing notification of the second on-screen display message.

* * * * *

UNITED STATES PATENT AND TRADEMARK OFFICE
CERTIFICATE OF CORRECTION

| | | |
|---|---|---|
| PATENT NO. | : 7,111,315 B1 | Page 1 of 1 |
| APPLICATION NO. | : 09/134270 | |
| DATED | : September 19, 2006 | |
| INVENTOR(S) | : Takashi Tsurumoto | |

It is certified that error appears in the above-identified patent and that said Letters Patent is hereby corrected as shown below:

Column 13, line 41, ""reference event_id"" should read --"reference_event_id"--.

Signed and Sealed this

Nineteenth Day of June, 2007

JON W. DUDAS
*Director of the United States Patent and Trademark Office*